June 6, 1961 A. E. RICE ET AL 2,986,767
CASTER
Filed Nov. 8, 1957 3 Sheets-Sheet 1

INVENTORS.
ALBERT E. RICE
ADELBERT F. RICE
BY
Hyde, Meyer, Baldwin & Doran
ATTORNEYS June 6, 1961   A. E. RICE ET AL   2,986,767
CASTER Filed Nov. 8, 1957   3 Sheets-Sheet 2

INVENTORS.
ALBERT E. RICE
ADELBERT F. RICE
BY Hyde, Meyer, Baldwin & Doran
ATTORNEYS June 6, 1961　　A. E. RICE ET AL　　2,986,767
CASTER Filed Nov. 8, 1957　　3 Sheets-Sheet 3

INVENTORS
ALBERT E. RICE
ADELBERT F. RICE
BY
Hyde, Meyer, Baldwin & Doran
ATTORNEYS United States Patent Office 2,986,767
Patented June 6, 1961

2,986,767
CASTER
Albert Edward Rice and Adelbert Ford Rice, both of 522 Leader Bldg., Cleveland 15, Ohio
Filed Nov. 8, 1957, Ser. No. 695,458
10 Claims. (Cl. 16—21)

This invention relates to casters and more particularly to casters adapted for use with articles of furniture and the like.

An object of this invention is to provide a caster having a sealed race, wherein the grease contained therein cannot escape to mar shoes and floors and one into which dirt or other fine particles cannot enter.

Another object of this invention is to provide a novel caster embodying novel bearing construction, wherein the ball bearings lie on one level which is substantially in the plane of the cross portion of the frame or caster yoke.

Still another object of this invention is to provide a novel caster wherein the parts comprising the race form an integral and rigid connection with the frame or yoke.

A further object of this invention is to provide a caster in which the axle of the supporting wheel or roller is located closer to the line of vertical force exerted upon the caster, and also one in which the top of the wheel is located closely adjacent the bottom of the supported article of furniture or the like.

Another object of the present invention is to provide a novel caster characterized by its structural simplicity, the ease of assembly of its parts, its strong and sturdy nature and its low manufacturing cost. Other features of this invention reside in the arrangement and design of the parts for carrying out their appropriate functions.

Other objects and advantages of this invention will be apparent from the accompanying drawings and the following description and the essential features will be set forth in the appended claims.

Figure 1:
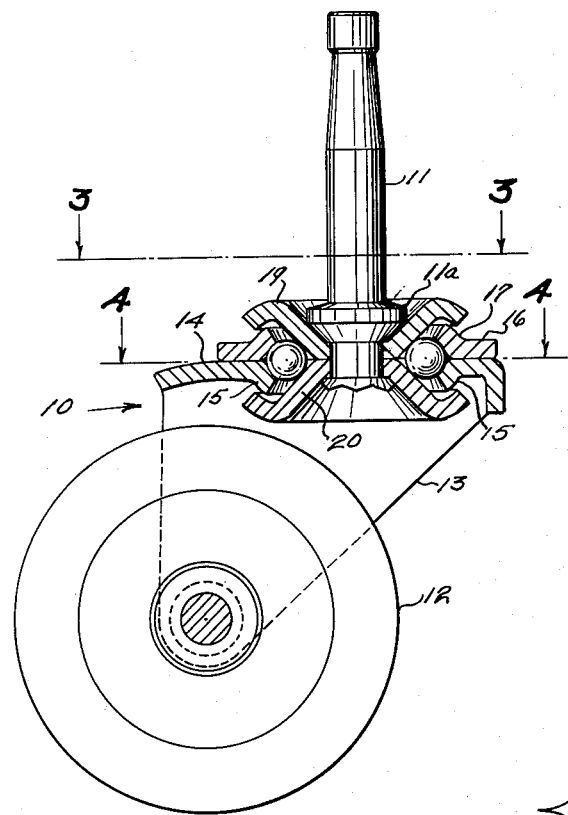
FIG. 1 is a vertical sectional view taken through one embodiment of the present invention.

Referring now to FIGS. 1 to 4 wherein one form of the present invention is shown; the caster comprises the usual three main members, which include a frame or yoke 10, a pintle 11 forming a caster supporting stem, and a roller or wheel 12 carried at the lower ends of the frame or yoke 10.

The yoke 10 includes a pair of spaced depending side members 13 and a cross portion 14 connecting said side members. The wheel 12 is journalled for rotation between the depending side members 13 at their lower ends. For the purpose of providing an anti-friction bearing construction, the caster is formed with a suitable ball race which contains suitable ball bearings.

The lower half of the outer race is formed by cross portion 14 of yoke 10 in which an annular central opening is provided. The peripheral edge 15 of the opening is curved downwardly and inwardly so as to provide a concave race surface on its inner wall. The upper half of the outer race member comprises a ring 16 having a central opening of equal diameter to that in the cross portion 14 and is positioned upon the top surface of the cross portion 14, so that both openings are in registry. The upper annular race member 16 has the peripheral edge 17 of its opening curved upwardly and inwardly to form a concave race surface which together with the race surface 15 forms a complete outer race.

As seen in FIG. 1, the inner race is formed by upper and lower opposed generally frusto-conical members 19 and 20, respectively. Each of the stampings is annular in form and contains a central opening. The radically outermost edges of the frusto-conical members 19 and 20 are turned over to extend beyond and partially embrace the radially inner edges of the outer race portions 15 and 17 and thereby form a housing which substantially completely encloses and seals the ball bearings 18 contained between the inner and outer races. The stem or pintle 11 passes through the central openings contained in the inner race members 19 and 20 in such a manner that the enlarged inverted frusto-conical collar 11a, integral with the stem 11, engages the inner surface of the upper member 19 while the lower end of the pintle or stem is peened over against the lower surface of the inner member 20 so as to clinch the radially innermost edges of the two parts 19 and 20 together.

Figure 2:
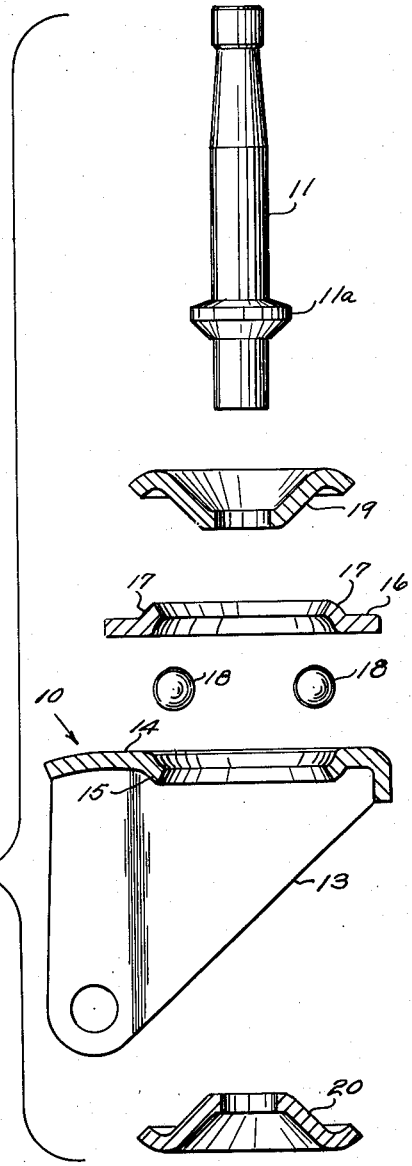
FIG. 2 is an exploded view of the parts comprising the caster frame shown in FIG. 1 prior to assembly.
Figure 3:
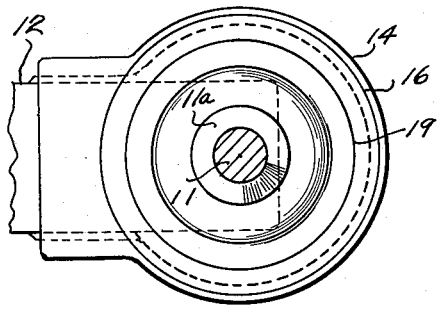
FIG. 3 is a cross sectional view taken along the plane of line 3—3 of FIG. 1.
Figure 4:
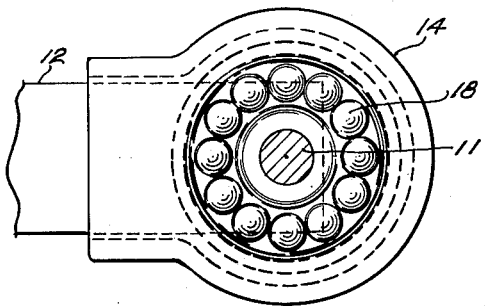
FIG. 4 is a cross sectional view taken along the plane of line 4—4 of FIG. 1.

The manner of assembling the parts, as seen in FIG. 1, may now be set forth. In FIG. 2 the parts are shown in their respective positions prior to assembly. The cross portion 14 provides the outer lower race surface. The upper outer race member 16 which has been stamped or formed separately is then rigidly secured to the cross portion by the process of welding, riveting, soldering or any other suitable means. The lower inverted frusto-conical member 20 is then passed upwardly through the opening contained in the cross portion 14. The ball bearings 18 are then inserted into the race formed by the two outer upper and lower race portions 15 and 17 and the inner lower race member 20. The inner upper frusto-conical race member 19 is then passed downwardly through the opening contained in the upper outer race member 19 to thereby completely form the ball race. The pintle or stem 11 is then passed downwardly through the central openings of the various members so that the enlarged inverted frusto-conical portion 11a engages the upper surface of the inner upper race member 19. The lower end of the stem is then peened over, as shown in FIG. 1, whereby the radially innermost edges of the pair of inner inverted frusto-conical members 19 and 20 are very tightly and rigidly connected together. The radially outermost edges of the inverted frusto-conical members 19 and 20 which envelope and overlap the open ends of the outer race members, thereby form a housing completely enclosing and sealing the balls 18. Of course, it will be understood that the balls 18 must not be clamped against movement in the raceways during the assembly operation, since free movement of the balls is always necessary.

Figure 5:
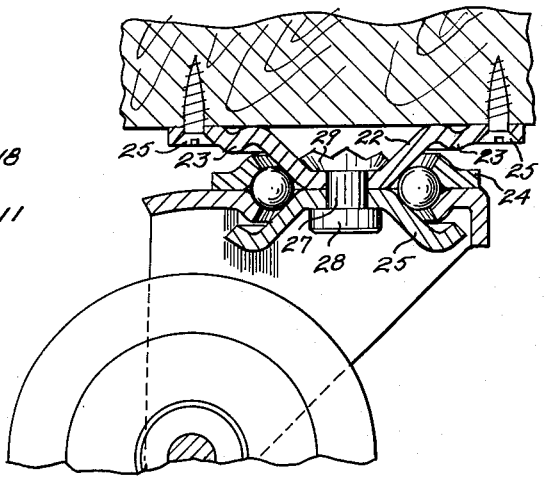
FIG. 5 is a vertical view, similar to FIG. 1 but showing a modified embodiment of the present invention.

In FIG. 5 of the drawings there is illustrated a modification of the present invention in which the parts of the caster are very similar to those previously described with relation to FIGS. 1 to 4. However, in this embodiment, the stem or pintle is dispensed with and the inner upper race member is provided in the form of an attachment plate 22 having a substantially horizontal upper portion and a downwardly extending frusto-conical central portion constructed in much the same manner as member 19 shown in FIG. 1. For the purpose of forming an enclosed ball race, the horizontal upper portion of the attachment plate 22 is formed with an annular downwardly extending annular ridge or rim 23 which encloses the open end of the outer upper race member 24, as seen in FIG. 5. The inner lower race member 25 is constructed in a manner substantially identical to the inverted frusto-conical member 20 of FIG. 1. The horizontal portion of attachment plate 22 located radially outward from the downwardly projecting ridge 23 is provided with a plurality of holes which receive retaining screws 25 for the purpose of securing the caster to an article of furniture or the like. The general method of assemblage of the parts in FIG. 5 is substantially the same as in FIGS. 1 to 4. In FIG. 5, however, the stem or pintle is replaced by means of a retaining pin 27 which is formed with an enlarged head 28 at its lower end, while its upper end is peened over as shown at 29 so as to unite and rigidly connect together the radially innermost edges of the inner upper and lower race members 22 and 25 respectively. The present construction eliminates the necessity of the central pintle and thereby greatly simplifies the operation of attaching the caster to an article of furniture. It will be understood that the attachment plate as well as the other component parts of the present caster may be constructed from metal stampings or in any other suitable manner.

Figure 6:
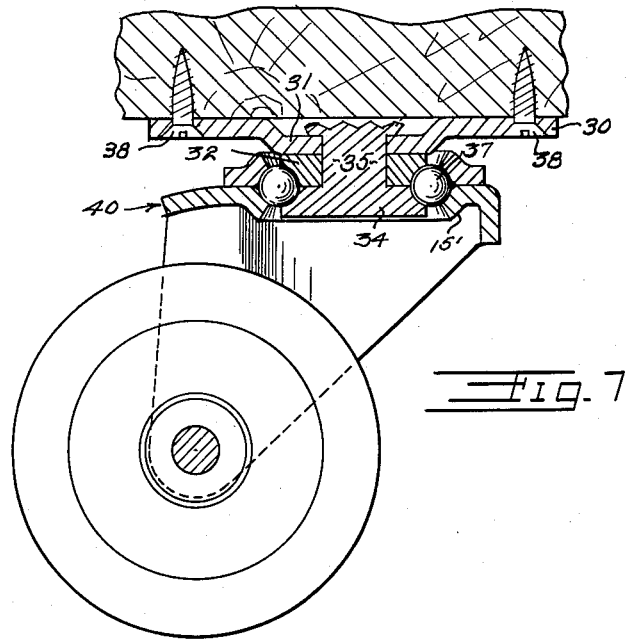
FIG. 6 is a vertical sectional view of still another embodiment of the present invention.
Figure 7:
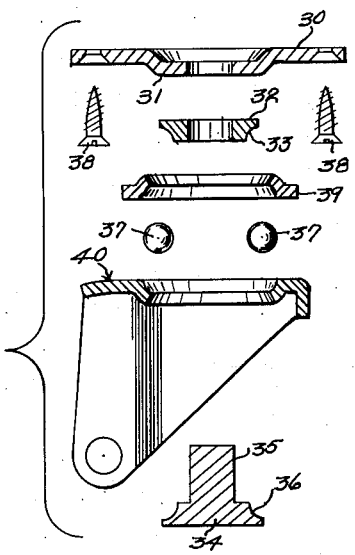
FIG. 7 is an exploded view of the parts comprising the caster frame illustrated in FIG. 6, prior to assembly.

In FIGS. 6 and 7 of the drawings there is illustrated another modification of the present invention in which the general construction and parts are very similar to those described in FIG. 5. In this modification, the construction of the inner raceway has been somewhat modified from that shown in FIG. 5. In FIG. 6 the attachment plate 30 is provided with a substantially horizontal upper portion and a slightly depressed central portion 31. It will be noted that the depressed central portion of the member 30 in FIG. 6 extends downwardly to a less extent than the frusto-conical portion of member 22 in FIG. 5. An annular ring 32 having a central opening is assembled against the lower surface of the depressed central portion 31 of attachment plate 30. The lower radially outermost edge of the ring member 32 is cut away in an annularly concave beveled manner to provide an upper inner raceway 33. The inner lower raceway is provided by means of an enlarged head portion 34 provided on a securing pin or stem 35. The enlarged head portion has a diameter substantially equal to that of ring member 32 and has its upper surface in contiguous engagement with the lower surface of ring member 32. The upper radially outermost edge of the enlarged head portion is cut away in an annularly concave beveled manner to provide an inner lower raceway 36 which cooperates with the inner upper raceway 33 to provide an inner ball race for ball bearings 37. The upper end of pin 35 is peened over as at 38 and rigidly unites the attachment plate 30 and ring member 32. It will be noted that the peened over end of pin 35 is contained within the depressed central portion 31 of the attachment plate 30. As in FIG. 5, the horizontal portion of attachment plate 30 is provided with a plurality of openings which receive securing screws 38 for the purpose of attaching the caster to articles of furniture or the like. The remainder of the parts are substantially identical to those shown in the embodiments of FIGS. 1 and 5, the outer race being indicated at 15', 17'.

The parts comprising the caster shown in FIG. 6 are shown in an exploded view in FIG. 7. The manner of assembly is as follows: the outer upper race member 39 is first secured by any suitable means to the frame or yoke 40 of the caster. The pin member 35 with its enlarged head portion is then passed upwardly through the central opening in the yoke. The ball bearings 37 are then inserted into the raceway thus provided, and the upper ring member 32 is brought downwardly into position in a manner concentric to the stem 35. The attachment plate 30 is then inserted over the stem 35 and brought downwardly until its lower surface meets the upper surface of ring member 32. The stem is then peened over as heretofore described and the caster parts are thereby very tightly and rigidly connected together. Under these conditions, of course, the bearing balls 37 will be retained in the raceway provided by the members 40, 39, 34 and 32. Care, of course, must always be exercised in the assembly operation so that the balls 37 are not clamped against movement in the raceways.

Figure 8:
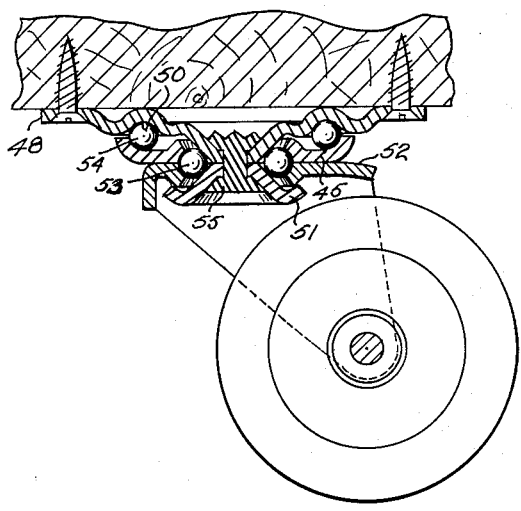
FIG. 8 is a vertical sectional view of still another embodiment of the present invention showing a caster employing a pair of ball races located on different levels.
Figure 9:
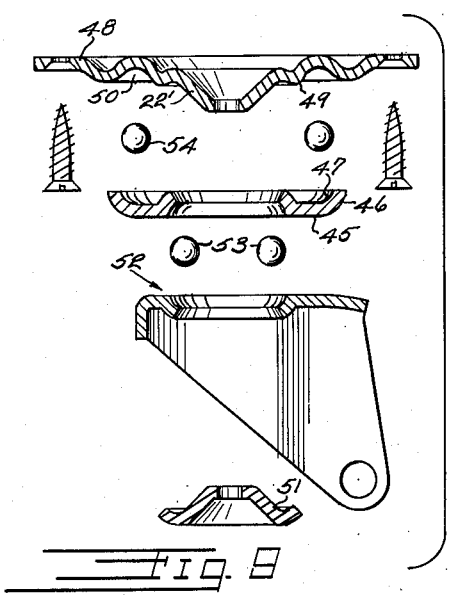
FIG. 9 is an exploded view of the parts comprising the caster frame shown in FIG. 8 prior to assembly.

In FIGS. 8 and 9, there is illustrated still another embodiment of the present invention which is adapted for industrial or heavy-duty purposes. The caster herein shown is provided with a plurality of ball raceways located on different levels. The lower ball race is constructed in a manner substantially identical to that shown in the embodiment of FIG. 5. The upper ball race is accomplished by radially extending the outer upper race member 45 of the lower race in such a manner that its radially outermost edge is provided with an upwardly and slightly outwardly formed flange 46 so as to form a cup or raceway 47. Attachment plate 48 forms an inner race member for balls 53 and is constructed in a manner somewhat similar to that shown in the embodiment of FIG. 5 and includes a substantially horizontal portion and a downwardly extending frusto-conical central portion 22'. The horizontal portion of the attachment plate in addition to the downwardly extending annular rim or ridge 49 which overlies the outer upper race member of the lower race, is provided with an annular groove or depression 50 in its lower surface which cooperates with the raceway 47 of the race member 45 to form an upper level ball race. It will be understood that the deformations caused by the annular ridge 49 and annular grooves 50 provided in the horizontal portion of the attachment plate, serve the additional purpose of reinforcing the attachment plate. The manner of assembling the parts shown in exploded view in FIG. 9 is identical to that described in connection with FIG. 5 with the exception of the upper radially outermost ball race. After the outer, upper race member 45 and inner, lower race member 51 are secured to the frame or yoke 52 and the ball bearings 53 positioned within the ball race provided thereby, the upper set of ball bearings 54 are then inserted into the cup-like raceway 47, after which the attachment plate 48 is lowered into a position wherein the groove or upper raceway 50 supports and lightly engages the upper portions of the ball bearings 54, while its central downwardly extending frusto-conical portion 22' extends downwardly into the central opening provided in the upper race member and the yoke 52 to a zone wherein its lower surface lies contiguous to the upper surface of the inner lower frusto-conical race member 51. The members are then securely and rigidly fastened together by central pin 55 in the manner heretofore described. Through the provision of a double level ball race caster, it is possible to support much greater loads than previously and the additional ball bearings permit easier and more friction-free movement under such additional loading.

Figure 10:
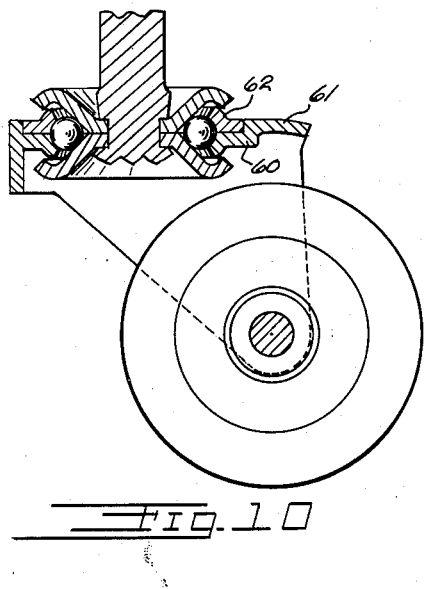
FIG. 10 is a vertical sectional view of still another embodiment of the present invention.
Figure 11:
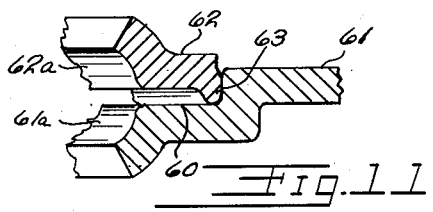
FIGS. 11 and 12 are enlarged detail views showing the process of assembling and connecting the race members of the caster frame illustrated in FIG. 10.
Figure 12:
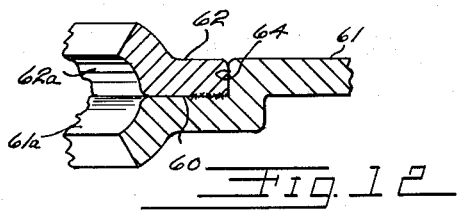

In FIG. 10 of the drawings there is illustrated a modified method of constructing and assembling the outer race members of the caster. The structure of the caster shown in FIG. 10 is substantially identical to that shown in FIG. 1 with the exception of an annular depressed recess or offset portion 60 adjacent the inner periphery of the cross portion 61 of the yoke or frame member. The depth of this recess is substantially equal to the thickness of the outer upper annular race member 62, which constructed identical to the race member 16 shown in FIG. 1, with the exception preferably of being provided at its radially outermost lower edge with a downwardly extending lip or flange 63, as seen in FIG. 11. The purpose of the present structure is to facilitate the assembly operation. During assembly it will be understood that the race member 62 is positioned within the depressed recess 60, as seen in FIG. 11, so that the lip 63 is in contact with the radially outermost portion of the recess 60. The cross portion 61 of the yoke is then connected to one pole of a welding apparatus while the annular race member 62 is connected to the other pole of the welding apparatus, and a suitable welding current passed therethrough to produce a desired result, wherein the lip 63, and portions 60 and 62 are fused together so as to provide an integrally connected outer raceway, as seen in FIG. 12. It will be noted that in the welded position, as seen in FIG. 12, the upper surfaces of the cross portion 61 and the annular race member 62 are flush and lie substantially in the same plane. Through the provision of this novel structure and method it is possible to quickly and readily perform the assembling operation of the caster.

Whether or not the welding lip 63 is provided as shown in FIG. 11, the parts may be accurately stamped by dies so that the surfaces meeting at 64 (FIG. 12) are exactly positioned relative to race surfaces 61a and 62a. Then when the parts are assembled as in FIG. 12 by any method, a smooth race 61a, 62a is assured.

Through the various embodiments of the casters illustrated in the drawings and described above, it will be perceived that the objectives initially specified herein are achieved.

By moving the level of the ball bearings upwardly into substantial alignment with the plane of the cross portion of the yoke or frame member in each caster embodiment herein shown, it is possible to raise the wheel or roller to a position wherein its uppermost point is closer to the bottom surface of the leg, chair or other article of furniture, thereby reducing the distance between the floor and the respective article of furniture which has the desired effect of decreasing the moment of force to which the caster is subject, and also of greatly improving the ornamental appearance of the furniture. Through the novel construction of providing a central opening in the cross portion of the frame of yoke and then turning the peripheral edges formed by said opening downwardly and inwardly to form the outer lower race member, additional reinforcing of the frame or yoke is achieved. The strength of the entire caster race and frame assembly is thereby greatly enhanced.

In view of the foregoing description, taken in conjunction with the accompanying drawings, it is believed that a clear understanding of the construction, operation and advantages of the present invention will be quite apparent to those skilled in this art.

It is to be understood, however, that even though there is herein shown and described the preferred embodiments of the invention, the same are susceptible to certain changes fully comprehended by the spirit of the invention.

Having thus described our invention and illustrated its use, what we claim is new and desire to secure by Letters Patent is:

1. A caster comprising a yoke; said yoke having integrally formed depending side members and a cross portion connecting said side members; a wheel rotatably supported by said yoke between said depending side members for rotation about a horizontal axis line relative to said yoke; said cross portion having a central opening integrally formed and coaxially arranged on an axis extending perpendicular to and spaced a given first distance from said axis line, an annular surface extending outwardly from and concentrically surrounding said opening forming one outer annular half-race surface, and one flat annular surface extending outwardly from said one half-race surface and lying in a plane transverse to said axis with said plane spaced a given second distance from said axis line; an annular outer race member having integrally formed and coaxially arranged a central opening, an annular surface extending outwardly from and concentrically surrounding said central opening forming another outer annular half-race surface, and another flat annular surface extending outwardly from said other half-race surface and lying in said transverse plane; said annular surfaces being made of weldable metal and being rigidly welded together to provide a double thickness welded ring around said axis with said outer half-race surfaces coaxially aligned and forming an outer race surface generally bisected by said plane; an inner race member having integrally formed and coaxially arranged a central opening, and one inner annular half-race surface extending outwardly from and concentrically surrounding said opening; an inner race means having another inner annular half-race surface; fastening means carried by said inner race means and extending through said central openings and securing together said inner race member and said inner race means with said inner half-race surfaces coaxially aligned to form an inner race surface so that said race surfaces are concentric and define a ball race coaxial with said axis formed by said inner and outer annular half-race surfaces; said fastening means securing together said inner race means and inner race member in contact on annular surfaces thereof located in said plane and between the central opening and inner half-race surfaces thereof; each of said half-race surfaces being cold worked metal for greater strength; means for securing the caster to an article to be supported thereby; and a plurality of balls located in the ball race and circumferentially arranged about said axis to reduce the friction between said half-race surfaces during relative rotation of said inner and outer race surfaces about said axis; said balls being located by said half-race surfaces so that said balls are substantially bisected by said plane, simultaneously engage said race at opposite sides of said axis underload, and are located in the plane of said cross portion; whereby said given distances are minimized to minimize the binding action on said balls and said caster is easily assembled, has few parts, is strong in construction, freely pivots on said balls about said axis, and has minimum height so as to support an article at minimum height above said axis line and to make the presence of the caster less conspicuous.

2. A caster, as set forth in claim 1, with each of said inner half-race surfaces integrally including an outwardly extending concentric annular lip; each of said lips fitting snugly around the outside of one of said outer half-race surfaces to close said ball race, to cover said balls, and to seal against dirt entry and grease escape with respect to said ball race.

3. A caster, as set forth in claim 2, with said inner race member and said inner race means being two parts of identical shape, each part having a central opening with one of said inner half-race surfaces extending outwardly from this opening, and said two mentioned fastening means including a pin extending along said axis and through said central openings in said pieces and having enlarged heads straddling and maintaining in contact said pieces and being common to both of said last mentioned fastening means.

4. A caster, as set forth in claim 1, with said inner race member having holes therein, said means for securing the caster to an article including attaching screws extending through said holes in said inner race member.

5. A caster, as set forth in claim 4, with said cross portion being rotatable relative to said inner race member through a path defined by said balls and race, said screws being located vertically within the path followed by said cross portion.

6. A caster, as set forth in claim 4, with said cross portion being rotatable relative to said inner race member through a path defined by said balls and race, said screws being located vertically outside the path followed by said cross portion.

7. A caster, as set forth in claim 4, with said outer race member having an annular lower race surface, said inner race member having an annular upper race surface located above said lower race surface and forming therewith another ball race for additional balls.

8. A caster, as set forth in claim 1, with said inner race means and said first mentioned fastening means including a one piece member extending through said central openings and having said other inner annular half-race surface.

9. A caster, as set forth in claim 1, with said cross portion having its flat annular surface in a circular recess concentric with its central opening and the flat annular surface of said annular outer race member telescopically fitting into said recess and secured therein in flush relationship.

10. A caster, as set forth in claim 9, with said fastening means including on said outer race member a welding lip extending into said recess before securement and fused to secure said cross portion and outer race member together.

References Cited in the file of this patent

UNITED STATES PATENTS

| | | |
|---|---|---|
| 604,887 | Nickel | May 31, 1898 |
| 684,068 | Kinney | Oct. 8, 1901 |
| 716,340 | Livingstone | Dec. 16, 1902 |
| 751,663 | Livingstone | Feb. 9, 1904 |
| 951,503 | Johnston | Mar. 8, 1910 |
| 1,602,919 | Matheson | Oct. 12, 1926 |
| 1,740,299 | Henkle | Dec. 17, 1929 |
| 1,743,143 | Johnson | Jan. 14, 1930 |
| 1,793,827 | Pribil | Feb. 24, 1931 |
| 1,912,795 | Rice et al. | June 6, 1933 |
| 2,111,561 | Herold | Mar. 22, 1938 |
| 2,140,403 | Johnson | Dec. 13, 1938 |
| 2,494,009 | Sharp | Jan. 10, 1950 |
| 2,500,886 | Torkelson | Mar. 14, 1950 |
| 2,521,948 | Rice et al. | Sept. 12, 1950 |
| 2,723,415 | Taylor et al. | Nov. 15, 1955 |
| 2,823,553 | Harrington | Feb. 18, 1958 |